US012706637B2

(12) United States Patent
Jiang et al.

(10) Patent No.: US 12,706,637 B2
(45) Date of Patent: Aug. 11, 2026

(54) TRANSMISSION METHOD AND APPARATUS, DEVICE, AND READABLE STORAGE MEDIUM

(71) Applicant: VIVO MOBILE COMMUNICATION CO., LTD., Chang'an (CN)

(72) Inventors: Dajie Jiang, Chang'an (CN); Kun Yang, Chang'an (CN); Xuanbing Liu, Chang'an (CN); Hao Liu, Chang'an (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 362 days.

(21) Appl. No.: 18/462,939

(22) Filed: Sep. 7, 2023

(65) Prior Publication Data

US 2023/0421209 A1 Dec. 28, 2023

Related U.S. Application Data

(63) Continuation of application No. PCT/CN2022/079532, filed on Mar. 7, 2022.

(30) Foreign Application Priority Data

Mar. 9, 2021 (CN) ......................... 202110257318.8

(51) Int. Cl.
*H04B 7/04* (2017.01)
*H04W 24/02* (2009.01)

(52) U.S. Cl.
CPC ........ *H04B 7/04013* (2023.05); *H04W 24/02* (2013.01)

(58) Field of Classification Search
CPC ........................... H04B 7/04013; H04W 24/02
See application file for complete search history.

(56) References Cited

U.S. PATENT DOCUMENTS

| | | | | |
|---|---|---|---|---|
| 2017/0117633 | A1 | 4/2017 | Park et al. | |
| 2022/0271995 | A1* | 8/2022 | Dai | H04B 7/0617 |
| 2023/0041198 | A1 | 2/2023 | Chen et al. | |
| 2023/0292277 | A1 | 9/2023 | Dou et al. | |

FOREIGN PATENT DOCUMENTS

| | | | |
|---|---|---|---|
| CN | 110278017 | A | 9/2019 |
| CN | 111181662 | A | 5/2020 |
| CN | 111245494 | A | 6/2020 |

(Continued)

OTHER PUBLICATIONS

Journal of Latex Class Files—Gui Zhou, Student, IEEE, Cunhua Pan, Member; IEEE, Hong Ren, Member, IEEE, Kezhi Wang, Member; IEEE, and Arumugam Nallanathan, Fellow, IEEE; "Intelligent Reflecting Surface Aided Multigroup Multicast MISO Communication Systems" reported on May 13, 2020.

(Continued)

*Primary Examiner* — Ayodeji O Ayotunde
(74) *Attorney, Agent, or Firm* — Foley & Lardner LLP

(57) ABSTRACT

A transmission method and apparatus, a device, and a readable storage medium are provided. The method includes: sending first information to a second device, where the first information is used for indicating at least one of a reconfigurable intelligent surface RIS capability, an RIS type, and an RIS parameter.

20 Claims, 3 Drawing Sheets

301

Receive first information from a first device, where the first information is used for indicating at least one of a reconfigurable intelligent surface capability, a reconfigurable intelligent surface type, and a reconfigurable intelligent surface parameter

(56) References Cited

FOREIGN PATENT DOCUMENTS

| | | | |
|---|---|---|---|
| CN | 111817768 | A | 10/2020 |
| CN | 111818533 | A | 10/2020 |
| CN | 111865387 | A | 10/2020 |
| CN | 111866726 | A | 10/2020 |
| CN | 111901014 | A | 11/2020 |
| CN | 113747464 | A | 12/2021 |
| CN | 113747465 | A | 12/2021 |

OTHER PUBLICATIONS

European Extended Search Report related to Application No. 22766267.3; reported on Jul. 19, 2024.

IEEE Open Journal of the Communications Society—Baoling Sheen, Jin Yang, Xianglong Feng, and Md Moin Uddin Chowdhury; "A Deep Learning Based Modeling of Reconfigurable Intelligent Surface Assisted Wireless Communications for Phase Shift Configuration" reported on Feb. 12, 2021.

Chinese first Office Action related to Application No. 202110257318.8; reported on Aug. 4, 2023.

International Search Report & Written Opinion related to Application No. PCT/CN2022/079532; Reported on May 25, 2022.

Channel estimation and frame structure design for intelligent reflective surface—assisted wireless communications; Radio communications Technology, vol. 47 No. 1, 2021.

Mobile Communications, A review of smart surface technologies for 6G, ISSN 1006-1010 CN 44-1301/TN, vol. 44, Jun. 2020.

* cited by examiner

201

Send first information to a second device, where the first information is used for indicating a reconfigurable intelligent surface capability, a reconfigurable intelligent surface type, and/or a reconfigurable intelligent surface parameter

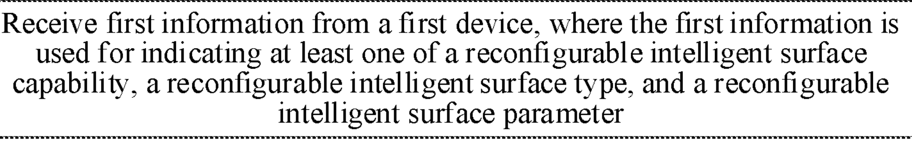
FIG. 3
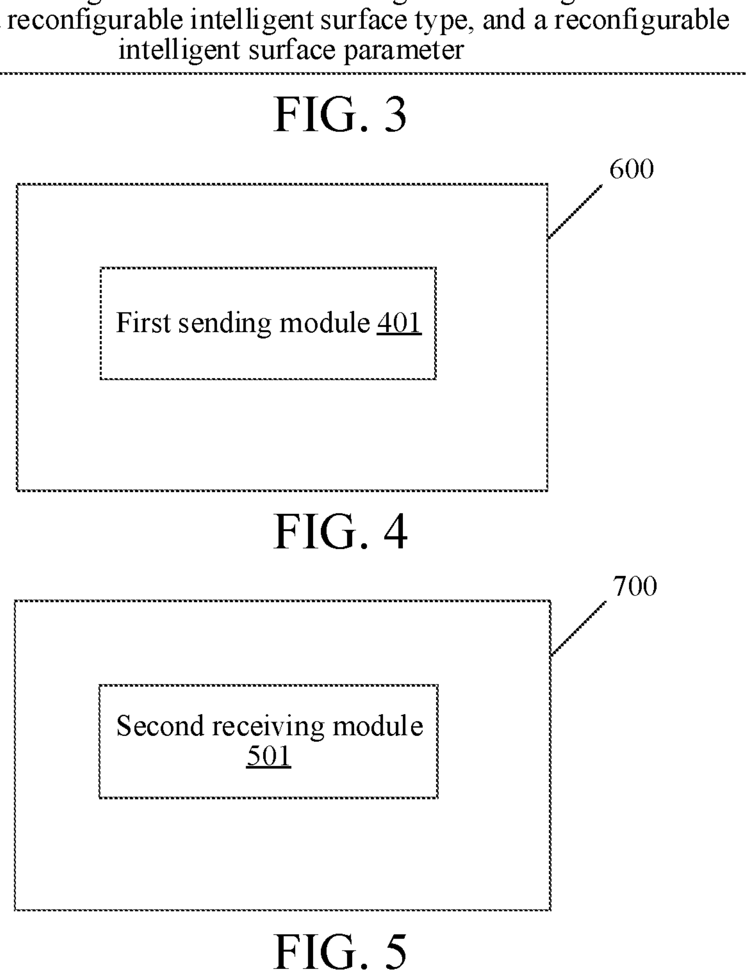
FIG. 4
FIG. 5

TRANSMISSION METHOD AND APPARATUS, DEVICE, AND READABLE STORAGE MEDIUM

CROSS-REFERENCE TO RELATED APPLICATIONS

This application is continuation application of PCT International Application No. PCT/CN2022/079532 filed on Mar. 7, 2022, which claims the priority of Chinese Patent Application No. 202110257318.8 filed in China on Mar. 9, 2021, the entire content of which are incorporated by reference in their entireties herein.

TECHNICAL FIELD

This application relates to the technical field of communications, and specifically, to a transmission method and apparatus, a device, and a readable storage medium.

BACKGROUND

There are many types of reconfigurable intelligent surfaces (RIS's), and not all parameters of different types of RIS's are the same. In a case that a communication device associated an RIS does not know a type, a parameter, or a capability of the RIS, the communication device cannot control a reflection or transmissive behavior of the RIS.

SUMMARY

An objective of embodiments of this application is to provide a transmission method and apparatus, a device, and a readable storage medium.

According to a first aspect, provided is a transmission method, performed by a first device, including:

sending first information to a second device, where the first information is used for indicating at least one of an RIS capability, an RIS type, and an RIS parameter.

According to a second aspect, provided is a transmission method, performed by a second device, including:

receiving first information from a first device, where the first information is used for indicating at least one of an RIS capability, an RIS type, and an RIS parameter.

According to a third aspect, provided is a transmission apparatus, applied to a first device, including:

a first sending module, configured to send first information to a second device, where the first information is used for indicating at least one of a reconfigurable intelligent surface RIS capability, an RIS type, and an RIS parameter.

According to a fourth aspect, provided is a transmission apparatus, applied to a second device, including:

a second receiving module, configured to receive first information from a first device, where the first information is used for indicating at least one of an RIS capability, an RIS type, and an RIS parameter.

According to a fifth aspect, provided is a communication device, including: a processor, a memory, and a program stored on the memory and executable on the processor, where the program, when executed by the processor, implements the steps of the method according to the first aspect or the second aspect.

According to a sixth aspect, provided is a readable storage medium, where the readable storage medium stores a program or instructions, where the program or instructions, when executed by a processor, implement the steps of the method according to the first aspect or the second aspect.

According to a seventh aspect, provided is a program product, stored in a non-volatile storage medium, where the program product, when executed by at least one processor, implements the steps of the processing method according to the first aspect or the second aspect.

According to an eighth aspect, provided is a chip, including a processor and a communication interface, where the communication interface is coupled to the processor, and the processor is configured to run a program or instructions to implement the processing method according to the first aspect or the second aspect.

According to a ninth aspect, provided is a communication device, configured to perform the steps of the method according to the first aspect or the second aspect.

In the embodiments of this application, the first device may send the first information to the second device, so that the second device associated with the RIS may obtain an RIS capability, an RIS type, and/or an RIS parameter of the RIS.

BRIEF DESCRIPTION OF THE DRAWINGS

FIG. 3 is a second flowchart of a transmission method according to an embodiment of this application;

FIG. 4 is a first schematic diagram of a transmission apparatus according to an embodiment of this application;

FIG. 5 is a second schematic diagram of a transmission apparatus according to an embodiment of this application.

DETAILED DESCRIPTION

Figures 1, 2:
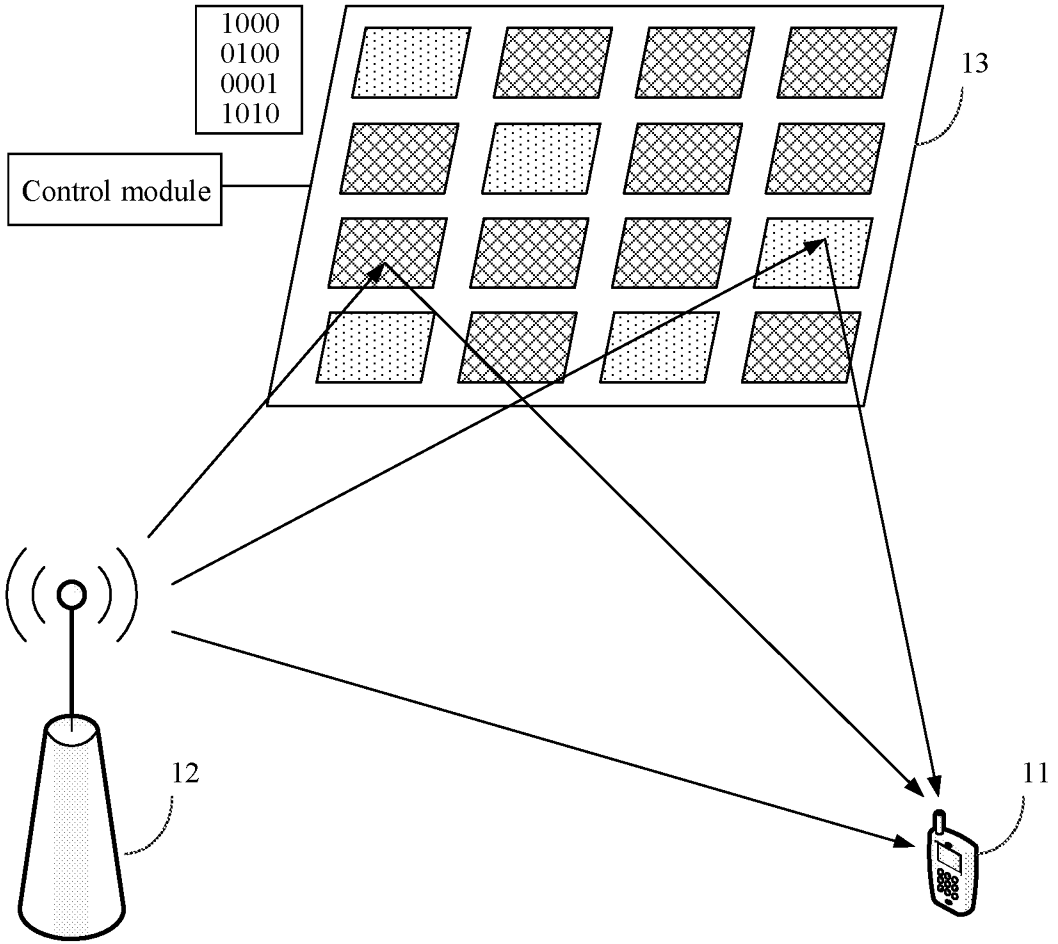
FIG. 1 is a block diagram of a radio communication system according to an embodiment of this application.
FIG. 2 is a first flowchart of a transmission method according to an embodiment of this application.

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application shall fall within the protection scope of this application.

The specification and claims of this application, and terms "first" and "second" are used to distinguish similar objects, but are unnecessarily used to describe a specific sequence or order. It is to be understood that data used in this way is exchangeable in a proper case, so that the embodiments of this application described herein can be implemented in an order different from the order shown or described herein, and in addition, the objects distinguished by "first" and "second" are generally one type, and the number of the objects is not limited, for example, there may be one first object, or a plurality of first objects. In addition, "and/or" used in this specification and the claims represents at least one of the connected objects, and the character "/" generally indicates that the associated objects are in an "or" relationship.

It is worth pointing out that the technologies described in the embodiments of this application are not limited to the long term evolution (LTE)/LTE-advanced (LTE-A) systems, and may also be used in other radio communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably. The technology described in this application can be applied to the systems and radio technologies mentioned above, and can also be applied to other systems and radio technologies. However, the following description describes a new radio (NR) system for example purposes, and uses NR terminology in most of the following description, although these technologies can also be applied to applications other than NR system applications, such as a 6$^{th}$ generation (6G) communication system.

In order to facilitate the understanding of the embodiments of this application, the following technical points are first introduced:

1. Intelligent Surface/Meta-Material Surfaces:

An intelligent surface is an emerging technology with a plurality of related terms, which indicate similar technologies or entities. These terms include:

large intelligent surface (LIS);
smart reflect array (SRA);
reconfigurable reflect array (RRA);
intelligent reflecting surface (IRS); and
reconfigurable intelligent surface (RIS).

An intelligent surface device is formed by a large-scale device array and an array control module. The large-scale device array is a large number of device units arranged regularly and repeatedly on a planar substrate. To achieve a considerable signal manipulation effect, typically, hundreds or thousands of device units are needed, to form a device array. The array control module of the intelligent surface can control an operating state of each device unit, so as to dynamically or semi-statically control a response mode of each device unit to a wireless signal. Wireless response signals of all of the device units of the large-scale device array are superimposed with each other, to form a specific beam propagation feature on a macroscopic scale. A control module is the "brain" of the intelligent surface device, and determines a wireless signal response beam of the intelligent surface according to requirements of a communication system, so that an original static communication environment becomes "intelligent" and "controllable".

The intelligent surface technology has been applied in many technical fields, and there are many different design schemes according to different application scenarios. When classified according to physical principles of the device units, types of intelligent surfaces include a tunable resonator variable capacitance type, a guided wave waveguide type, an element rotation polarization type, and the like; when classified according to wireless signal output forms, the intelligent surfaces include reflective type intelligent surfaces and transmissive type intelligent surfaces; when classified according to wireless signal response parameters, the intelligent surfaces include a phase control type intelligent surface, an amplitude control type intelligent surface, and an amplitude phase joint control type intelligent surface; when classified according to response parameter control, types of the intelligent surfaces include a continuous control type and a discrete control type; and when classified according to frequency or speed of controlling an amplitude and phase of an intelligent surface, the intelligent surfaces include static, semi-static/dynamic control intelligent surfaces, where a static intelligent surface can be applied to an existing system at present, for example, a fourth generation (4G) mobile communication technology/a fifth generation (5G) mobile communication technology system. Considering the complexity of device design and fabrication, discrete control device units using single wireless signal response parameters are typically selected for research. At present, the intelligent reflecting surface (IRS) widely discussed in the academic circles is a phase control intelligent surface based on signal reflection. A phase of a reflected signal of an information control device unit is indicated by 1 bit, thereby implementing phase reversal of 0 or $\pi$.

An intelligent surface device has several advantages over conventional wireless communication transceiver devices due to that the intelligent surface device does not need a radio frequency and baseband processing circuit:

(1) the intelligent surface device has a lower cost and implementation complexity;
(2) the intelligent surface device has a lower power consumption;
(3) the intelligent surface does not introduce additional thermal noise at a receiving end; and
(4) the intelligent surface device has a small thickness and weight, which can implement flexible deployment.

There are the following types of RIS's:

(1) Tunable resonator: A variable capacitor is integrated into a resonator to produce a phase shift by varying a frequency-agile patch resonator frequency.
(2) Guided wave control method: In this case, a spatial wave arrived is coupled to a guided wave by an antenna, and then the guided wave is phase-shifted and retransmitted, to form an antenna phase shifter.
(3) Rotating technology of circularly polarized wave: Design is carried out based on reflection rules of an electromagnetic wave.

Further, when classified from the perspective of whether dynamic control can be performed, reflective array/intelligent surface devices include two categories:

(1) Static reflective array/intelligent surface devices: A structure and function of a reflective array may be fixed. For an incident wave at an angle, super-surface units cause fixed changes in properties such as an amplitude, a phase, and a polarization manner of the incident wave, to obtain a corresponding reflected wave.
(2) Dynamic reflective array/intelligent surface device: A structure and function of a reflective array may be controlled. For an incident wave of an angle, properties such as an amplitude, a phase, and a polarization manner of the incident wave may be changed differently through programmable control, to obtain a corresponding reflected wave. To achieve programmable control of a reflective metasurface, a switch element (for example, a diode) needs to be introduced into a reflective unit. PIN diodes are a common choice for controlling a reconfigurable metasurface. The PIN diodes have a wide range of radio frequency impedance and a low distortion, and are widely used in the field of microwave radio frequency. The switch element in the reflective unit has a plurality of different states, and switching between different states can be implemented by controlling on/off of the switch element. For on and off states of the switch element, the structure and performance of the corresponding reflective unit change greatly. In other words, reflective units in different states have different control modes for properties such as an amplitude, a phase, and polarization of an incident wave.

2. Passive Intelligent Surface:

Since an intelligent surface is formed by a large number of passive device units and does not have a radio frequency and baseband processing capability, and therefore such the intelligent surface is referred to as a passive intelligent surface.

3. Active-Passive Combined Intelligent Surface (or Active Intelligent Surface):

A passive intelligent surface is composed of a large number of passive device units and does not have a radio frequency and baseband processing capability, the passive device units cannot receive, measure, or transmit signals, and therefore a base station cannot obtain channel information from the base station to the intelligent surface and from the intelligent surface to a terminal, respectively. A signal received by the base station or the terminal is formed by superposing response signals of the large number of intelligent surface device units, and by changing a working state of one or a few number of device units, the received signal cannot be altered significantly. A possible measurement solution includes: mounting a few number of active device units in the intelligent surface, so that the intelligent surface can perform channel measurement and feedback. The base station derives a proper intelligent surface configuration parameter from limited channel information by using compressed sensing or a deep learning algorithm. A communication system based on an intelligent surface needs an efficient channel measurement mechanism, to improve the end-to-end signal quality while guaranteeing a low complexity of the intelligent surface. Such the intelligent surface on which some active devices are mounted has a capability of receiving or even sending a signal, and is an active-passive combined intelligent surface (or an active intelligent surface).

FIG. 1 is a block diagram of an applicable radio communication system according to an embodiment of this application. The radio communication system includes a terminal 11, a network side device 12, and an intelligent surface device 13. The terminal 11 may also be referred to as a terminal device or user equipment (UE). The terminal 11 may be a terminal-side device such as a mobile phone, a tablet computer, a laptop computer or referred to as a notebook computer, a personal digital assistant (PDA), a palm computer, a netbook, an ultra-mobile personal computer (UMPC), a mobile Internet device (MID), a wearable device or in-vehicle equipment (VUE), or a pedestrian terminal (PUE). The wearable device includes: a bracelet, a headphone, glasses, or the like. It should be noted that: the specific type of the terminal 11 is not limited in the embodiments of the present disclosure.

The network side device 12 may be a base station or a core-network network device, where the base station may be referred to as a Node B, an evolved Node B, an access point, a base transceiver station (BTS), a radio base station, a radio transceiver, a basic service set (BasicServiceSet, BSS), an extended service set (ExtendedServiceS et, ESS), a node B, an evolved node B (eNB), a home node B, a home evolved node B, a wireless local area network (WLAN) access point, a wireless fidelity (WiFi) node, a transmitting receiving point (TRP), a wireless access network node, or some other appropriate terms in the field, as long as the same technical effect is achieved, the base station is not limited to a specified technical term. It should be noted that, in the embodiments of this application, for example, only a base station in an NR system is used, but a specific type of the base station is not limited.

The following describes in detail a transmission method and apparatus, a device, and a readable storage medium provided in the embodiments of this application by using some embodiments and application scenarios thereof with reference to the accompanying drawings.

Referring to FIG. 2, an embodiment of this application further provides a transmission method. The method may be performed by a first device, and the first device includes, but is not limited to, one of the following: an RIS, a relay node (for example, a layer-1 relay, a layer-2 relay, a layer-3 relay, or an integrated access and backhaul (IAB) node, a repeater). It should be noted that, the first device has some capabilities or some features of the RIS; and the specific steps of the method include: Step 201.

Step 201: Send first information to a second device, where the first information is used for indicating a reconfigurable intelligent surface RIS capability, an RIS type, and/or an RIS parameter.

In an implementation of this application, the method further includes:

receiving second information sent by the second device, where the second information is used for instructing the first device to send the first information.

Optionally, the first device may be an RIS or a relay node, and the second device may be a base station to which the RIS or the relay node pertains; or, the first device may be a first base station, the second device may be a second base station, or the second device may be a terminal served by the first base station, or the second device may be an RIS or a relay node served by the first base station; or, the first device may be a first RIS or a first relay node, and the second device may be a second RIS or a second relay node.

Scenario 1: The first device is an RIS, the second device is a base station, and the base station may be a base station to which the RIS pertains, or any base station in a plurality of base stations associated with the RIS.

In this example, the base station queries the RIS for RIS related information by using the second information, where the second information triggers the RIS to report an RIS capability, an RIS type, and/or an RIS parameter to the base station.

Scenario 2: The first device is a first base station, and the second device is a second base station.

In this example, the first base station transmits an RIS capability, an RIS type, and/or an RIS parameter of the RIS associated with the first base station to the second base station.

Scenario 3: The first device is a first base station, and the second device is UE served by the first base station or an RIS served by the first base station.

In this example, the first base station sends an RIS capability, an RIS type, and/or an RIS parameter of the RIS associated with the first base station to the UE served by the first base station or the RIS served by the first base station.

Scenario 4: The first device is a first RIS, and the second device is a second RIS.

In this example, the first RIS sends an RIS capability, an RIS type, and/or an RIS parameter of the first RIS to the second RIS.

In an implementation of this application, the first device may send the first information to the second device in the following manner:

(1) after the first device is powered on, sending the first information to the second device;

for example, in an RIS registration process or addition process, actively sending the first information to the second device; and (2) sending the first information to the second device based on a preset period;

in other words, periodically sending the first information to the second device.

It may be understood that, the sending the first information may be sending the first information in a wired transmission manner, or may be sending the first information in a wireless transmission manner.

In an implementation of this application, the RIS type includes one of the following:

(1) a transmissive type RIS;

(2) a reflective type RIS;

(3) a transmissive-reflective type RIS, where the transmissive-reflective type RIS refers to an RIS that supports both reflection and transmission;

(4) an active RIS;

(5) a passive RIS;

(6) an active-passive combined RIS;

(7) a type of a control device that controls an RIS unit, where for example, the control device may be a capacitance-variable diode, a switch diode, a liquid crystal, or graphene, a ferroelectric, a ferromagnetic, a phase-variable material, or other semiconductors; or (8) a type of an RIS unit, where optionally, the type of the RIS unit (a type of an RIS reflective or transmissive unit) may be a metal, a dielectric, a tunable element, or the like.

In an implementation of this application, the RIS capability includes one or more of the following:

(1) Adjusting or manipulating a feature of a first signal: The first signal is a signal sent by a device other than the first device; for example, in a case that the first device is an RIS, the first signal may be a signal sent by a base station associated with the RIS.

Optionally, the feature includes one or more of the following: a phase, an amplitude, a polarization manner, a frequency, an orbital angular momentum (OAM).

(2) For an adjustment manner for the first signal, the adjustment manner includes:

a continuous adjustment manner or a discrete adjustment manner.

It may be understood that the adjustment to the first signal may be continuous adjustment or discrete adjustment. For example, during adjustment of a phase (or amplitude) of the first signal by the RIS, whether the adjustment is continuous phase adjustment or discrete phase adjustment (or continuous amplitude adjustment or discrete amplitude adjustment) needs to be reported to the base station.

(3) A quantity of states of discrete features in the discrete adjustment manner.

It may be understood that, during discrete adjustment, the quantity of states of discrete features needs to be reported to the base station. For example, for RIS reflective units controlled by switch diodes, in a case that each RIS unit controls a phase of a first signal through on and off of a switch diode, this is equivalent to controlling two states by using 1 bit. Still for example, in a case that each RIS unit controls a phase of a first signal through on and off of two switch diodes, this is equivalent to controlling four states by using 2 bits.

In a case that the RIS unit can adjust a plurality of parameters (for example, controlling the amplitude and the phase), states of the RIS unit correspond to a combination of the plurality of parameters, and at least one of the parameters is different from the other states. A relationship between the quantity N of states of the RIS unit and a quantity B of control information bits is $$N \le 2^\wedge B,$$

where N and B are greater than or equal to 1.

(4) An adjustment speed of an RIS:

It may be understood that the unit of the adjustment speed may be millisecond, microsecond, nanosecond, or the like.

(5) A time gap between receiving of control signaling and completing of adjustment by an RIS.

(6) A precision of synchronization between RIS units.

(7) Adjustable beam information of an RIS.

For example, the adjustable beam information of an RIS may include: an identifier of an adjustable beam of the RIS, and a direction and a beam width (for example, 3 dB) of each adjustable beam, and the like.

The adjustable beam corresponds to a state pattern of a controller of each RIS unit.

(8) Working bandwidth and/or frequency information of an RIS.

For example, the working bandwidth of the RIS is a working bandwidth supporting 2 GHz-3 GHz.

In an implementation of this application, the RIS parameter includes one or more of the following:

(1) An arrangement manner of RIS units.

Optionally, the arrangement manner of the RIS units includes: matrix arrangement, circular arrangement, or arrangement of another shape, such as sparse arrangement.

It may be understood that, during reporting of the arrangement manner of the RIS units, necessary parameter information may be carried, for example, a quantity of rows and a quantity of columns or length and width dimensions of the matrix arrangement, a radius or a quantity of RIS's of the circular arrangement, or a rule and a generation manner of the sparse arrangement.

(2) A quantity of RIS units.

(3) A dimension and/or a thickness of an RIS unit.

Optionally, the dimension of the RIS unit includes one or more of the following: a length of the RIS unit, a width of the RIS unit, or a thickness of the RIS unit.

Specifically, the dimension of the RIS unit is determined based on a wavelength $\lambda$, and a scaling factor $\beta$ of a central frequency point of a working bandwidth of the RIS unit, that is, the dimension of the RIS unit is $\beta\lambda$.

(4) A shape of an RIS unit.

(5) A spacing between RIS units.

(6) A curvature of RIS units.

It may be understood that, in a case that all units of an RIS form a curved surface, the curvature of the RIS units may be reported to the second device.

(7) Locations of passive device units or active device units.

It may be understood that, for an RIS array including passive device units and active device units, the locations of the passive device units or the active device units are reported separately. Further, a position relationship between the active device units can be indirectly determined.

(8) A quantity of sub-RIS devices and/or relative locations of the respective sub-RIS devices, where the first device includes one or more sub-RIS devices, for example, a big RIS device includes a plurality of small sub-RIS devices spliced together, and a sub-RIS device is equivalent to a part of the RIS unit.

For example, the RIS unit may include 20×20 RIS units, totally 400 units on one side. The sub-RIS device may be understood as dividing 400 units into 4 regions, each region comprises 100 units, that is, one region is one sub-RIS device.

(9) Locations of RIS units.

(10) A location adjustable range of an RIS unit.

(11) A height of an RIS unit.

(12) A height adjustable range of an RIS unit.

(13) A tilt angle of an RIS unit.

(14) A tilt angle adjustable range of an RIS unit.

(15) A front orientation angle of an RIS unit.

(16) An adjustable range of a horizontal rotation angle of an RIS unit.

(17) Identity information of an RIS.

(18) An identification of a TRP associated with an RIS.

(19) A cell identity associated with an RIS, for example, a supported effective area, an area identity (Area ID) provided, or one or more cells supported provide a cell identity.

(20) A list of public land mobile networks (PLMNs) associated with an RIS.

(21) An expiration date or date of delivery of an RIS.

It may be understood that, the RIS reports RIS parameters related to transmission and reflection separately, for example, different RIS unit locations and quantities of RIS units corresponding to transmission and reflection. This is because a control circuit (for example, a field programmable gate array (FPGA)) of an RIS may be placed on the back of the RIS, and in this case, transmission performance of some RIS units near the FPGA may be affected, but reflection performance of the RIS units are substantially not affected. Therefore, the RIS parameters related to transmission and reflection need to be reported separately. For example, there are 100 RIS units in total, only 80 RIS units can be used in transmission, and the remaining 20 RIS units cannot be used as transmissive type surfaces because backs of the RIS units are provided with control circuits. In this way, the base station can control transmission-related adjustment of only 80 RIS units in a targeted manner.

In an implementation of this application, the first information further includes: a control manner of an RIS unit, where the control manner of the RIS unit includes one or more of the following: electric control, magnetic control, light control, or temperature control.

A tunable material or device used in the RIS has some features. For example, such the type of substance has a relatively significant and rapid physical property change under an external environmental stimulation. In a case that a magnetic field, an electric field, a temperature, a humidity, a pressure, and a light intensity of an external environment change, properties of such the type of material may be adjusted accordingly, so that the RIS can implement different modulation mechanisms. Optionally, a type of a substance used in the electronic control manner may also be reported to the second device. For example, in the electric control manner, a nematic liquid crystal or graphene, or the like may be used. In the magnetic control manner, a ferrite magnetic rod, a ferrite sheet, or the like may be used. In the light control manner, silicon, gallium arsenide, photoelectric semiconductor material, or the like is included. In the thermal control manner, a phase change material such as vanadium dioxide is included.

In the embodiments of this application, the first device may send the first information to the second device, so that the second device associated with the RIS may obtain an RIS capability, an RIS type, and/or an RIS parameter of the RIS, and further that the second device may control a reflection or transmissive behavior of the RIS based on the RIS capability, the RIS type, and/or the RIS parameter of the RIS.

Referring to FIG. 3, an embodiment of this application further provides a transmission method. The method is performed by a second device, and the second device includes, but is not limited to, one of the following: an RIS, a relay node (for example, a layer-1 relay, a layer-2 relay, a layer-3 relay, an IAB node, or a repeater), a base station, a terminal, or the like. The specific steps include: Step 301.

Step 301: Receive first information from a first device, where the first information is used for indicating at least one of an RIS capability, an RIS type, and an RIS parameter.

In an implementation of this application, the method further includes: sending second information, where the second information is used for instructing the first device to send the first information.

Optionally, the first device may be an RIS or a relay node, and the second device may be a base station to which the RIS or the relay node pertains; or, the first device may be a first base station, the second device is a second base station, or the second device may be a terminal served by the first base station, or the second device may be an RIS or a relay node served by the first base station; or, the first device may be a first RIS or a first relay node, and the second device is a second RIS or a second relay node.

In an implementation of this application, the RIS type includes one of the following:

(1) a transmissive type RIS;

(2) a reflective type RIS;

(3) a transmissive-reflective type RIS;

(4) an active RIS;

(5) a passive RIS;

(6) an active-passive combined RIS;

(7) a type of a control device that controls an RIS unit; or (8) a type of an RIS unit.

In an implementation of this application, the RIS capability includes one or more of the following:

(1) Adjusting or manipulating a feature of a first signal, where the first signal is a signal sent by a device other than the first device.

(2) For an adjustment manner for the first signal, the adjustment manner includes: a continuous adjustment manner or a discrete adjustment manner.

(3) A quantity of states of discrete features in the discrete adjustment manner.

(4) An adjustment speed of an RIS.

(5) A time gap between receiving of control signaling and completing of adjustment by an RIS.

(6) A precision of synchronization between RIS units.

(7) Adjustable beam information of an RIS.

(8) Working bandwidth and/or frequency information of an RIS unit.

In an implementation of this application, the feature includes one or more of the following: a phase, an amplitude, a polarization manner, a frequency, or an OAM.

In an implementation of this application, the RIS parameter includes one or more of the following:

(1) An arrangement manner of RIS units.

(2) A quantity of RIS units.

(3) A dimension and/or a thickness of an RIS unit.

(4) A shape of an RIS unit.

(5) A spacing between RIS units.

(6) A curvature of RIS units.

(7) Locations of passive device units or active device units.

(8) A quantity of sub-RIS devices and/or relative locations of the respective sub-RIS devices, where the first device includes one or more sub-RIS devices.
(9) Locations of RIS units.
(10) A location adjustable range of an RIS unit.
(11) A height of an RIS unit.
(12) A height adjustable range of an RIS unit.
(13) A tilt angle of an RIS unit.
(14) A tilt angle adjustable range of an RIS unit.
(15) A front orientation angle of an RIS unit.
(16) An adjustable range of a horizontal rotation angle of an RIS unit.
(17) Identity information of an RIS.
(18) An identification of a TRP associated with an RIS.
(19) A cell identity associated with an RIS.
(20) A list of PLMNs associated with an RIS.
(21) An expiration date or date of delivery of an RIS.

In an implementation of this application, the arrangement manner of the RIS units includes: matrix arrangement, circular arrangement, or arrangement of another shape.

In an implementation of this application, the dimension of the RIS unit includes one or more of the following: a length of the RIS unit, a width of the RIS unit, or a thickness of the RIS unit;

Specifically, the dimension of the RIS unit is determined based on a wavelength and a scaling factor of a central frequency point of a working bandwidth of the RIS unit.

In an implementation of this application, the first information further includes: a control manner of an RIS unit, where the control manner of the RIS unit includes one or more of the following: electric control, magnetic control, light control, or temperature control.

In the embodiments of this application, the first device may send the first information to the second device, so that the second device associated with the RIS may obtain an RIS capability, an RIS type, and/or an RIS parameter of the RIS, and further that the second device may control a reflection or transmissive behavior of the RIS based on the RIS capability, the RIS type, and/or the RIS parameter of the RIS.

Referring to FIG. 4, an embodiment of this application provides a transmission apparatus, applied to a first device. The first device includes, but is not limited to, one of the following: an RIS, a relay node, a base station, or the like. The apparatus 400 includes:

a first sending module 401, configured to send first information to a second device, where the first information is used for indicating at least one of a reconfigurable intelligent surface RIS capability, an RIS type, and an RIS parameter.

In an embodiment of this application, the apparatus 400 further includes:

a first receiving module, configured to receive second information sent by the second device, where the second information is used for instructing the first device to send the first information.

Optionally, the first device is an RIS or a relay node, where the second device is a base station to which the RIS or the relay node pertains; or, the first device is a first base station, the second device is a second base station, or the second device is a terminal served by the first base station, or the second device is an RIS or a relay node served by the first base station; or, the first device is a first RIS or a first relay node, and the second device is a second RIS or a second relay node.

In an implementation of this application, the first device may send the first information to the second device in the following manner:

(1) after the first device is powered on, sending the first information to the second device;
(2) sending the first information to the second device based on a preset period;

In an implementation of this application, the RIS type includes one of the following:

(1) a transmissive type RIS;
(2) a reflective type RIS;
(3) a transmissive-reflective type RIS;
(4) an active RIS;
(5) a passive RIS;
(6) an active-passive combined RIS;
(7) a type of a control device that controls an RIS unit; or
(8) a type of an RIS unit.

In an implementation of this application, the RIS capability includes one or more of the following:

(1) Adjusting or manipulating a feature of a first signal, where the first signal is a signal sent by a device other than the first device.
(2) For an adjustment manner for the first signal, the adjustment manner includes: a continuous adjustment manner or a discrete adjustment manner.
(3) A quantity of states of discrete features in the discrete adjustment manner.
(4) An adjustment speed of an RIS.
(5) A time gap between receiving of control signaling and completing of adjustment by an RIS.
(6) A precision of synchronization between RIS units.
(7) Adjustable beam information of an RIS.
(8) Working bandwidth and/or frequency information of an RIS.

In an implementation of this application, the feature includes one or more of the following: a phase, an amplitude, a polarization manner, a frequency, or an OAM.

In an implementation of this application, the RIS parameter includes one or more of the following:

(1) An arrangement manner of RIS units.
(2) A quantity of RIS units.
(3) A dimension and/or a thickness of an RIS unit.
(4) A shape of an RIS unit.
(5) A spacing between RIS units.
(6) A curvature of RIS units.
(7) Locations of passive device units or active device units.
(8) A quantity of sub-RIS devices and/or relative locations of the respective sub-RIS devices, where the first device includes one or more sub-RIS devices.
(9) Locations of RIS units.
(10) A location adjustable range of an RIS unit.
(11) A height of an RIS unit.
(12) A height adjustable range of an RIS unit.
(13) A tilt angle of an RIS unit.
(14) A tilt angle adjustable range of an RIS unit.
(15) A front orientation angle of an RIS unit.
(16) An adjustable range of a horizontal rotation angle of an RIS unit.
(17) Identity information of an RIS.
(18) An identification of a TRP associated with an RIS.
(19) A cell identity associated with an RIS.
(20) A list of PLMNs associated with an RIS.
(21) An expiration date or date of delivery of an RIS.

In an implementation of this application, the arrangement manner of the RIS units includes: matrix arrangement, circular arrangement, or arrangement of another shape.

In an implementation of this application, the dimension of the RIS unit includes: a length of the RIS unit, a width of the RIS unit, and/or a thickness of the RIS unit.

Optionally, the dimension of the RIS unit is determined based on a wavelength and a scaling factor of a central frequency point of a working bandwidth of the RIS unit.

In an implementation of this application, the first information further includes: a control manner of an RIS unit, where the control manner of the RIS unit includes one or more of the following: electric control, magnetic control, light control, or temperature control.

The apparatus provided in this embodiment of this application can implement each process implemented in the method embodiment shown in FIG. 2, and achieve a same technical effect. To avoid repetition, details are not described herein again.

Referring to FIG. 5, an embodiment of this application provides a transmission apparatus. The second device includes, but is not limited to, one of the following: an RIS, a relay node, a base station, a terminal, or the like. The apparatus 500 includes:

a second receiving module 501, configured to receive first information from the first device, where the first information is used for indicating at least one of an RIS capability, an RIS type, and an RIS parameter.

In an embodiment of this application, the apparatus also includes:

a second sending module, configured to send second information, where the second information is used for instructing the first device to send the first information.

Optionally, the first device is an RIS or a relay node, where the second device is a base station to which the RIS or the relay node pertains; or, the first device is a first base station, the second device is a second base station, or the second device is a terminal served by the first base station, or the second device is an RIS or a relay node served by the first base station; or, the first device is a first RIS or a first relay node, and the second device is a second RIS or a second relay node.

In an implementation of this application, the RIS type includes one of the following:

(1) a transmissive type RIS;
(2) a reflective type RIS;
(3) a transmissive-reflective type RIS;
(4) an active RIS;
(5) a passive RIS;
(6) an active-passive combined RIS;
(7) a type of a control device that controls an RIS unit; or
(8) a type of an RIS unit.

In an implementation of this application, the RIS capability includes one or more of the following:

(1) Adjusting or manipulating a feature of a first signal, where the first signal is a signal sent by a device other than the first device.
(2) For an adjustment manner for the first signal, the adjustment manner includes: a continuous adjustment manner or a discrete adjustment manner.
(3) A quantity of states of discrete features in the discrete adjustment manner.
(4) An adjustment speed of an RIS.
(5) A time gap between receiving of control signaling and completing of adjustment by an RIS.
(6) A precision of synchronization between RIS units.
(7) Adjustable beam information of an RIS.
(8) Working bandwidth and/or frequency information of an RIS unit.

In an implementation of this application, the feature includes one or more of the following: a phase, an amplitude, a polarization manner, a frequency, or an OAM.

In an implementation of this application, the RIS parameter includes one or more of the following:

(1) An arrangement manner of RIS units.
(2) A quantity of RIS units.
(3) A dimension and/or a thickness of an RIS unit.
(4) A shape of an RIS unit.
(5) A spacing between RIS units.
(6) A curvature of RIS units.
(7) Locations of passive device units or active device units.
(8) A quantity of sub-RIS devices and/or relative locations of the respective sub-RIS devices, where the first device includes one or more sub-RIS devices.
(9) Locations of RIS units.
(10) A location adjustable range of an RIS unit.
(11) A height of an RIS unit.
(12) A height adjustable range of an RIS unit.
(13) A tilt angle of an RIS unit.
(14) A tilt angle adjustable range of an RIS unit.
(15) A front orientation angle of an RIS unit.
(16) An adjustable range of a horizontal rotation angle of an RIS unit.
(17) Identity information of an RIS.
(18) An identification of a TRP associated with an RIS.
(19) A cell identity associated with an RIS.
(20) A list of PLMNs associated with an RIS.
(21) An expiration date or date of delivery of an RIS.

In an implementation of this application, the arrangement manner of the RIS units includes: matrix arrangement, circular arrangement, or arrangement of another shape.

In an implementation of this application, the dimension of the RIS unit includes one or more of the following: a length of the RIS unit, a width of the RIS unit, or a thickness of the RIS unit;

Optionally, the dimension of the RIS unit is determined based on a wavelength and a scaling factor of a central frequency point of a working bandwidth of the RIS unit.

In an implementation of this application, the first information further includes: a control manner of an RIS unit, where the control manner of the RIS unit includes one or more of the following: electric control, magnetic control, light control, or temperature control.

The apparatus provided in this embodiment of this application can implement each process implemented in the method embodiment shown in FIG. 3, and achieve a same technical effect. To avoid repetition, details are not described herein again.

Figure 6:
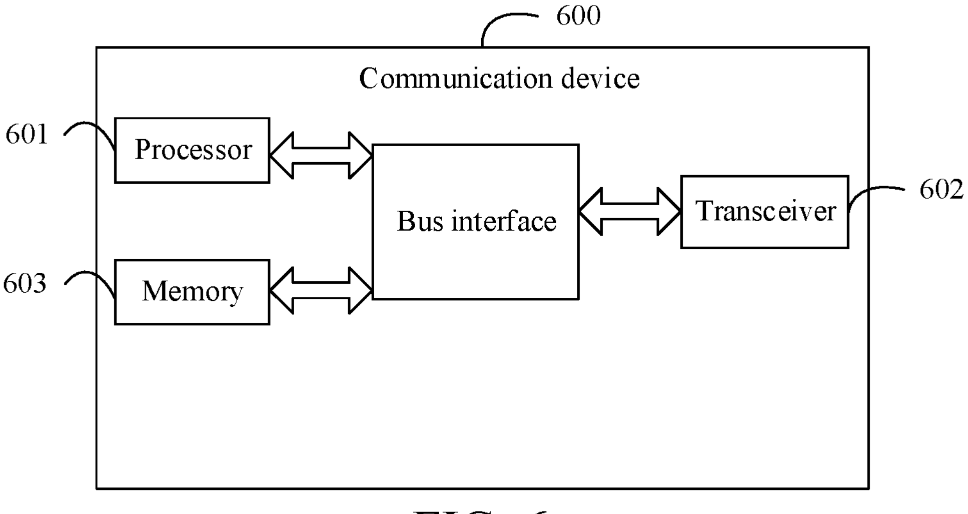
FIG. 6 is a schematic diagram of a communication device according to an embodiment of this application.

Referring to FIG. 6, an embodiment of the present disclosure provides a communication device 600, including: a processor 601, a transceiver 602, a memory 603, a user interface 604, and a bus interface.

The processor 601 may be responsible for managing a bus architecture and general processing. The memory 603 may store data used by the processor 601 when the processor 601 performs an operation.

In this embodiment of the present disclosure, the communication device 600 may further include: a computer program stored on the memory 603 and executable on the processor 601, where the computer program, when executed by the processor 601, implements the steps of the embodiment shown in FIG. 2 or FIG. 3.

In FIG. 6, a bus architecture may include any number of interconnected buses and bridges, specifically linked together by various circuits of one or more processors represented by a processor 601 and memories represented by a memory 603. The bus architecture may further link various other circuits such as peripheral devices, voltage regulators, and power management circuits together, which are well known in the art, and therefore is not further described in the embodiments of the present disclosure. The bus interface provides an interface. The transceiver 602 may be a plurality of elements, that is, including a transmitter and a receiver, for providing units for communicating with various other apparatuses on a transmission medium.

The communication device provided in the embodiments of the present disclosure may perform the method embodiment shown in FIG. 2 or FIG. 3. Their implementation principles and technical effects are similar. In this embodiment, details are not described herein again.

An embodiment of this application further provides a program product, stored in a non-volatile storage medium, and the program product is executed by at least one processor to implement the steps of the processing method shown in FIG. 2 or FIG. 3.

An embodiment of this application further provides a communication device, configured to perform each process of the embodiments of the foregoing method, and can achieve a same technical effect. To avoid repetition, details are not described herein again.

An embodiment of this application further provides a readable storage medium. The readable storage medium stores a program or instructions. The program or instructions, when executed by a processor, cause the processor to perform the processes of the foregoing method embodiment shown in FIG. 2 or FIG. 3, and in addition, the same technical effect can be achieved, which are not repeated herein in order to avoid duplication.

The processor is the processor in the terminal described in the foregoing embodiment. The readable storage medium includes a computer-readable storage medium, for example, a computer read-only memory (ROM), a random access memory (RAM), a disk, or an optical disk.

An embodiment of this application further provides a chip. The chip includes a processor and a communication interface. The communication interface is coupled to the processor. The processor is configured to run a network side device program or instructions to implement the processes of the foregoing method embodiment shown in FIG. 3 or FIG. 4, and in addition, the same technical effect can be achieved, which are not repeated herein in order to avoid duplication.

It should be understood that the chip mentioned in this embodiment of this application may also be referred to as a system-grade chip, a system chip, a chip system, or a system-on-a-chip.

It should be noted that: the terms "include", "comprise", or any other variation thereof in this specification is intended to cover a non-exclusive inclusion, so that the stated processes, methods, objects, or apparatuses including a series of elements not only include those elements, but also include other elements not explicitly listed, or further include elements inherent to such the processes, methods, objects, or apparatuses. Without more limitations, elements defined by the sentence "including one" does not exclude that there are still other same elements in the processes, methods, objects, or apparatuses. In addition, it should be noted that the scope of the methods and apparatuses in the embodiments of this application is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, the features described with reference to some examples can be combined in other examples.

According to the descriptions in the foregoing implementations, a person skilled in the art may clearly learn that the method according to the foregoing embodiments may be implemented by relying on software and a commodity hardware platform or by using hardware, and in most cases the former is the preferred. Based on such an understanding, the technical solutions of the present disclosure essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of this application.

The embodiments of this application have been described above with reference to the accompanying drawings. This application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. A transmission method, performed by a first device, comprising:

sending first information to a second device, wherein the first information is used for indicating a reconfigurable intelligent surface (RIS) capability, wherein the RIS capability comprises one or more of the following:

adjusting or manipulating a feature of a first signal, wherein the first signal is a signal sent by a device other than the first device;

for an adjustment manner for the first signal, the adjustment manner comprises: a continuous adjustment manner or a discrete adjustment manner;

a quantity of states of discrete features in the discrete adjustment manner;

an adjustment speed of an RIS;

a time gap between receiving of control signaling and completing of adjustment by an RIS; or a precision of synchronization between RIS units.

2. The method according to claim 1, wherein the method further comprises:

receiving second information sent by the second device, wherein the second information is used for instructing the first device to send the first information.

3. The method according to claim 1, wherein the step of sending the first information to a second device comprises:

after the first device is powered on, sending the first information to the second device;

or, sending the first information to the second device based on a preset period.

4. The method according to claim 1, wherein the first information is further used for indicating an RIS type, and the RIS type comprises one of the following:

a transmissive type RIS;

a reflective type RIS;

a transmissive-reflective type RIS;
an active RIS;
a passive RIS;
an active-passive combined RIS; or
a type of a control device that controls an RIS unit; or
a type of an RIS unit.

5. The method according to claim 1, wherein the RIS capability further comprises one or more of the following:
adjustable beam information of an RIS; or
working bandwidth and/or frequency information of an RIS.

6. The method according to claim 5, wherein the feature of the first signal comprises one or more of the following: a phase, an amplitude, a polarization manner, a frequency, or an orbital angular momentum (OAM).

7. The method according to claim 1, wherein the first information is further used for indicating an RIS parameter, and the RIS parameter comprises one or more of the following:
an arrangement manner of RIS units;
a quantity of RIS units;
a dimension and/or a thickness of an RIS unit;
a shape of an RIS unit;
a spacing between RIS units;
a curvature of RIS units;
locations of passive device units or active device units;
a quantity of sub-RIS devices and/or relative locations of the respective sub-RIS devices, wherein the first device comprises one or more sub-RIS devices;
locations of RIS units;
a location adjustable range of an RIS unit;
a height of an RIS unit;
a height adjustable range of an RIS unit;
a tilt angle of an RIS unit;
a tilt angle adjustable range of an RIS unit;
a front orientation angle of an RIS unit;
an adjustable range of a horizontal rotation angle of an RIS unit;
identity information of an RIS;
an identification of a transmission receiving node (TRP) associated with an RIS;
a cell identity associated with an RIS;
a list of public land mobile networks (PLMNs) associated with an RIS; or
an expiration date or date of delivery of an RIS.

8. The method according to claim 7, wherein the arrangement manner of RIS units comprises: matrix arrangement, circular arrangement, or arrangement of another shape.

9. The method according to claim 7, wherein the dimension of the RIS unit comprises one or more of the following: a length of the RIS unit, a width of the RIS unit, or a thickness of the RIS unit.

10. The method according to claim 1, wherein the first information further comprises: a control manner of an RIS unit, wherein the control manner of the RIS unit comprises one or more of the following: electric control, magnetic control, light control, or temperature control.

11. The method according to claim 1, wherein the first device is an RIS or a relay node, wherein the second device is a base station to which the RIS or the relay node pertains; or,
the first device is a first base station, the second device is a second base station, or the second device is a terminal served by the first base station, or the second device is an RIS or a relay node served by the first base station; or,
the first device is a first RIS or a first relay node, and the second device is a second RIS or a second relay node.

12. A transmission method, performed by a second device, comprising:
receiving first information from a first device, wherein the first information is used for indicating an RIS capability,
wherein the RIS capability comprises one or more of the following:
adjusting or manipulating a feature of a first signal, wherein the first signal is a signal sent by a device other than the first device;
for an adjustment manner for the first signal, the adjustment manner comprises: a continuous adjustment manner or a discrete adjustment manner;
a quantity of states of discrete features in the discrete adjustment manner;
an adjustment speed of an RIS;
a time gap between receiving of control signaling and completing of adjustment by an RIS; or
a precision of synchronization between RIS units.

13. The method according to claim 12, wherein the method further comprises:
sending second information, wherein the second information is used for instructing the first device to send the first information.

14. The method according to claim 12, wherein the first information is further used for indicating an RIS type, and the RIS type comprises one of the following:
a transmissive type RIS;
a reflective type RIS;
a transmissive-reflective type RIS;
an active RIS;
a passive RIS;
an active-passive combined RIS; or
a type of a control device that controls an RIS unit, wherein
a type of an RIS unit.

15. The method according to claim 12, wherein the RIS capability further comprises one or more of the following:
adjustable beam information of an RIS; or
working bandwidth and/or frequency information of an RIS unit.

16. A communication device, comprising: a processor, a memory, and a program stored in the memory and executable by the processor, wherein the program, when executed by the processor, implements:
sending first information to a second device, wherein the first information is used for indicating a reconfigurable intelligent surface (RIS) capability,
wherein the RIS capability comprises one or more of the following:
adjusting or manipulating a feature of a first signal, wherein the first signal is a signal sent by a device other than the first device;
for an adjustment manner for the first signal, the adjustment manner comprises: a continuous adjustment manner or a discrete adjustment manner;
a quantity of states of discrete features in the discrete adjustment manner;
an adjustment speed of an RIS;
a time gap between receiving of control signaling and completing of adjustment by an RIS; or
a precision of synchronization between RIS units.

17. The communication device according to claim 16, wherein the program, when executed by the processor, further implements:

receiving second information sent by the second device, wherein the second information is used for instructing the first device to send the first information.

18. The communication device according to claim 16, wherein the step of sending the first information to a second device comprises:

after the first device is powered on, sending the first information to the second device;

or, sending the first information to the second device based on a preset period.

19. The communication device according to claim 16, wherein the first information is further used for indicating an RIS type, and the RIS type comprises one of the following:

a transmissive type RIS;

a reflective type RIS;

a transmissive-reflective type RIS;

an active RIS;

a passive RIS;

an active-passive combined RIS; or a type of a control device that controls an RIS unit; or a type of an RIS unit.

20. A communication device, comprising: a processor, a memory, and a program stored in the memory and executable by the processor, wherein the program, when executed by the processor, implements the steps of the method according to claim 12.

* * * * *